United States Patent [19]

Leuthen

[11] Patent Number: 4,467,258
[45] Date of Patent: Aug. 21, 1984

[54] POWER FACTOR CORRECTION FOR VARIABLE SPEED DRIVE

[75] Inventor: John M. Leuthen, Claremore, Okla.

[73] Assignee: Hughes Tool Company, Houston, Tex.

[21] Appl. No.: 451,695

[22] Filed: Dec. 20, 1982

[51] Int. Cl.³ .............................................. H02P 5/40
[52] U.S. Cl. ..................................... 318/800; 318/803; 318/807
[58] Field of Search ............... 318/724, 438, 800–802, 318/807–811; 191/5, 6; 246/187 R, 187 A, 187 B, 187 C, 167 K

[56] References Cited

U.S. PATENT DOCUMENTS 4,024,444  5/1977  Dewan et al. ..................... 318/810
4,123,692  10/1978  Gilmore et al. ................... 318/811
4,145,647  3/1979  Neilsen et al. ..................... 318/810

OTHER PUBLICATIONS

Applicants: Dick L. Knox et al.; Ser. No. 06/313,043; filed: 10/19/81; For: "Motor Variable Frequency Drive".

Primary Examiner—G. Z. Rubinson
Assistant Examiner—Arthur G. Evans
Attorney, Agent, or Firm—Robert A. Felsman; James E. Bradley

[57] ABSTRACT

A variable speed drive for an AC motor has features to improve the power factor. The system uses a rectifier for converting AC supply voltage into DC voltage on a positive rail and a negative rail. Frequency switches are controlled to alternately connect the rails to the power conductors at a variable rate to define a selected voltage frequency. An amplitude switch is located on one of the rails and controlled to vary the potential between the rails in proportion to the frequency. A current sensor senses the current waveform in one of the conductors and applies it to a phase detector which detects the difference in phase between the current and the voltage. Phase difference pulses are produced which are averaged into an average DC value. The DC value is applied to a demand voltage that controls the amplitude switch to reduce the amplitude to improve power factor.

5 Claims, 6 Drawing Figures

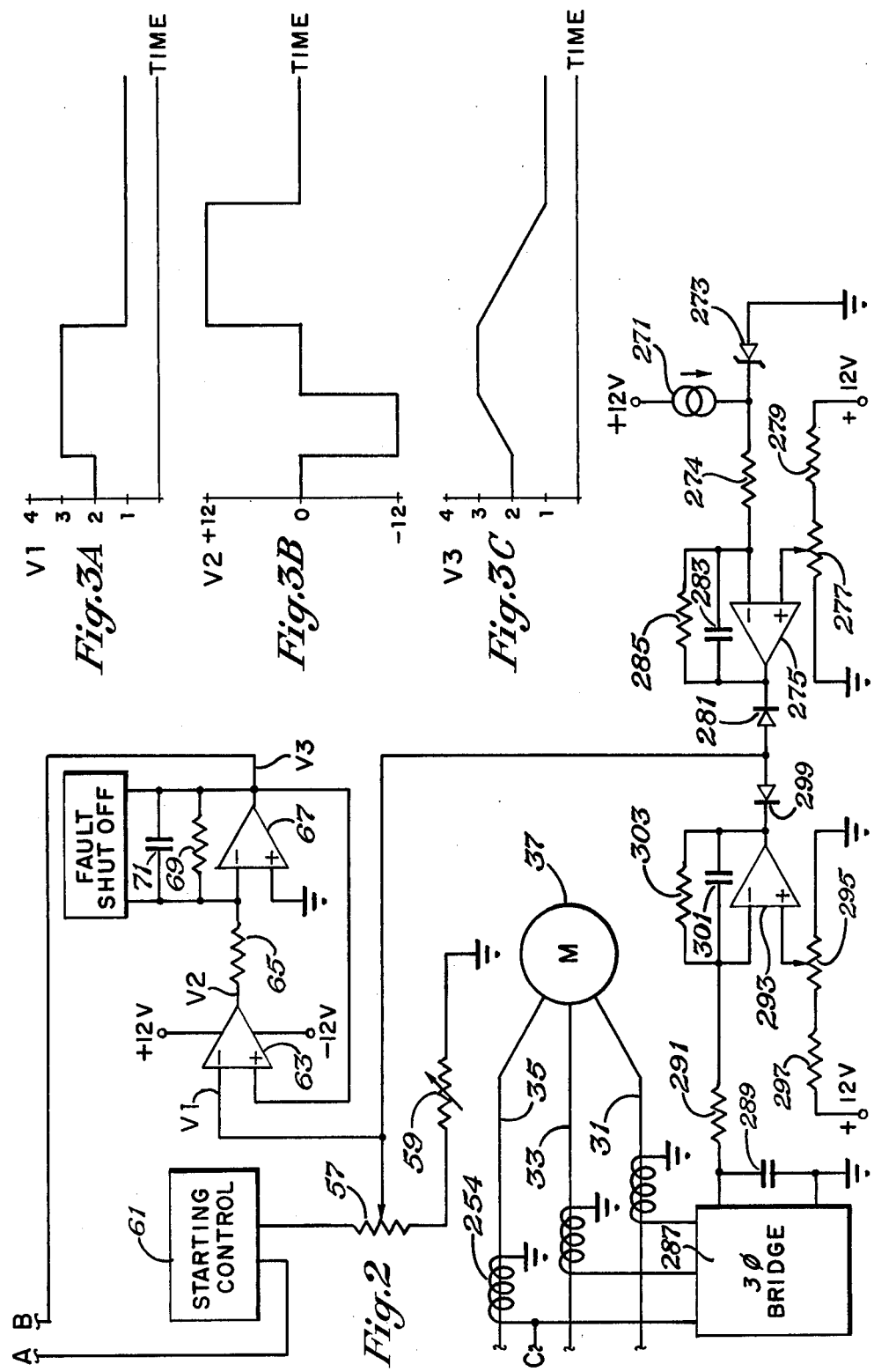

POWER FACTOR CORRECTION FOR VARIABLE SPEED DRIVE

BACKGROUND OF THE INVENTION

This invention relates in general to means for varying the speed of an AC (alternating current) motor, and in particular to means for varying the frequency and amplitude of the power supplied to the motor.

One way in which to vary the speed of an AC motor is to vary the frequency of the power being supplied. Normally the line power comes from a utility company at the standard 60 cycle per second frequency. There are circuits that will convert the standard frequency to different frequencies. These circuits also change the amplitude in proportion to the frequency change for efficient operation of the motor.

In commonly owned U.S. Pat. application Ser. No. 313,043, filed Oct. 19, 1981, Dick L. Knox, John M. Leuthen, and Kevin Lockyear (all of which is hereby incorporated by reference) a variable speed drive circuit is shown. In that circuit, a rectifier converts the AC three phase power supply into a DC (direct current). A FET (field effect transistor) switch is connected between the negative rail and one of the power conductors leading to the motor for each of the three phases. Similarly, three FET switches connect the positive rail to each of the three power conductors. These FET switches are switched on and off to produce a desired alternating current waveform of a selected frequency. Means are also employed to vary the amplitude in proportion to the frequency selected.

To accomplish these functions, a variable frequency oscillator is employed to provide pulses of frequency depending on the input selected. A binary counter counts these pulses up to a certain number, then repeats. For each count, the counter provides a binary output. A ROM (read only memory) receives the binary outputs and provides a programmed output for each of the FET switches to control the switching as determined by the frequency of the oscillator. The oscillator is controlled by a variable DC demand voltage.

Improvements to the system shown in the above identified application are desirable. It is well known that in induction motors the current lags the voltage by varying amounts depending upon the speed and load. The efficiency of the motor depends upon the phase angle difference between the current and the voltage. The phase angle difference, known as the power factor, can be improved by various means, such as adding capacity to the system or by decreasing the amplitude of the voltage.

SUMMARY OF THE INVENTION

The system employs means to vary the amplitude of the voltage in the positive and negative rails to improve the power factor. An amplitude switch is located in one of the rails for switching on and off the DC voltage. A current sensor senses the current waveform in one of the conductors. Phase detector means detects the phase difference between the current and the voltage frequency. The difference is converted into an average DC value and applied to a control circuit which controls the amplitude switch to reduce the potential between the rails proportionately.

BRIEF DESCRIPTION OF THE DRAWINGS

FIG. 2 is a electrical schematic of a portion of the system of FIG. 1.

FIG. 3a, FIG. 3b, and FIG. 3c, are graphs of the voltage at different points within the system as shown in FIG. 2.

DESCRIPTION OF THE PREFERRED EMBODIMENT

Overall System Components

Figure 1:
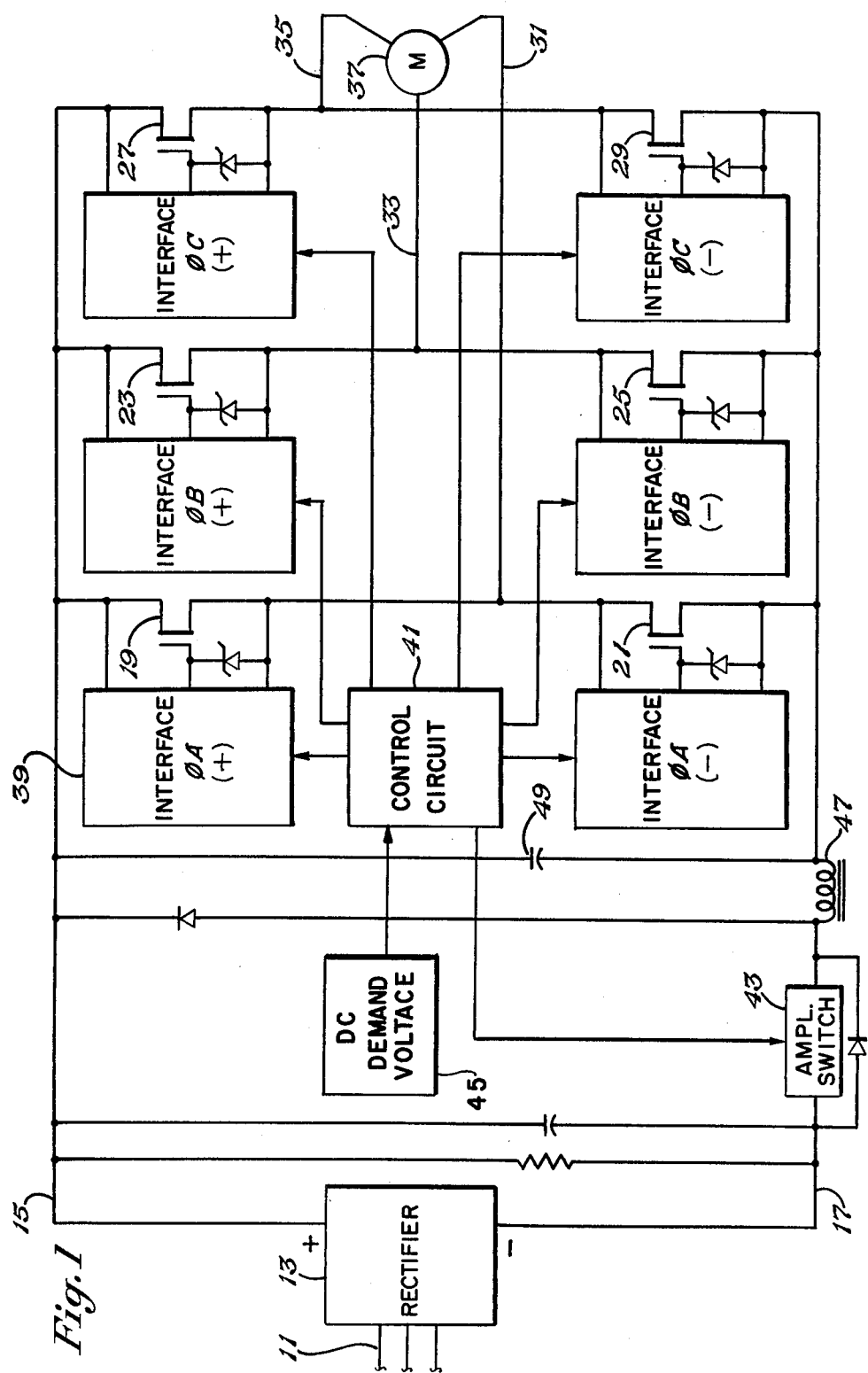
FIG. 1 is a schematic illustrating the overall variable speed system of this invention.

Referring to FIG. 1, three phase AC power is provided on three power cables 11. A rectifier 13 rectifies the three phase power into positive DC voltage on a positive rail 15 and negative DC voltage on a negative rail 17. FET switches 19 and 21 are connected in series between the rails 15 and 17. FET switches 23 and 25 are connected in a series between the rails 15 and 17 and parallel with switches 19 and 21. FET switches 27 and 29 are also connected between rails 15 and 17 in series.

A power conductor 31 is connected to the junction of switches 19 and 21. A power conductor 33 is connected to the junction of switches 23 and 25. A power conductor 35 is connected to the junction of switches 27 and 29. These conductors 31, 33 and 35 lead to a three-phase induction electric motor 37. An interface circuit 39 is connected to each switch 19, 21, 23, 25, 27 and 29 for controlling its respective switch. A control circuit 41 controls each interface circuit 39.

The control circuit 41, is programmed so as to cause the interface 39 for phase A to close switch 19 and open switch 21. Switch 19 will remain closed for one-half cycle while switch 21 will remain open, providing the positive DC current through line 31. At the end of the half cycle, the control circuit 41 will reverse the switches 19 and 21 so that the negative half of the cycle will be provided through line 33 to motor 37. Switches 23 and 25 for phase B will be operated in the same manner by control circuit 41, but 120 degrees later. Switches 27 and 29 will be operated in the same manner for phase C, but 120 degrees later than switches 23 and 25. This results in alternating current being provided to motor 37, with the frequency dependent upon how fast control circuit 41 switches the various FET switches. The speed of motor 31 is dependent upon the frequency. The frequency provided by control circuit 41 is varied by a variable DC demand voltage 45.

An amplitude switch 43 is connected into the negative rail 17 for opening and closing the negative rail 17. Amplitude switch 43 is controlled by a pulse width control portion of control circuit 41. The pulse width control circuit portion operates proportional to the frequency provided by the wave data circuit 41. As the frequency of the FET switches increases, the pulse width control portion increases the on duration of the amplitude switch 43 to provide a potential between rails 15 and 17 that is proportional to the desired frequency. A decrease in frequency results in amplitude switch 43 having less on duration, lowering the voltage between rails 15 and 17. Inductor 47 and capacitor 49 smooth the interruptions on rail 17 caused by the opening and closing of the amplitude switch 43.

Constant Slope Integrator Circuit

Figure 4:
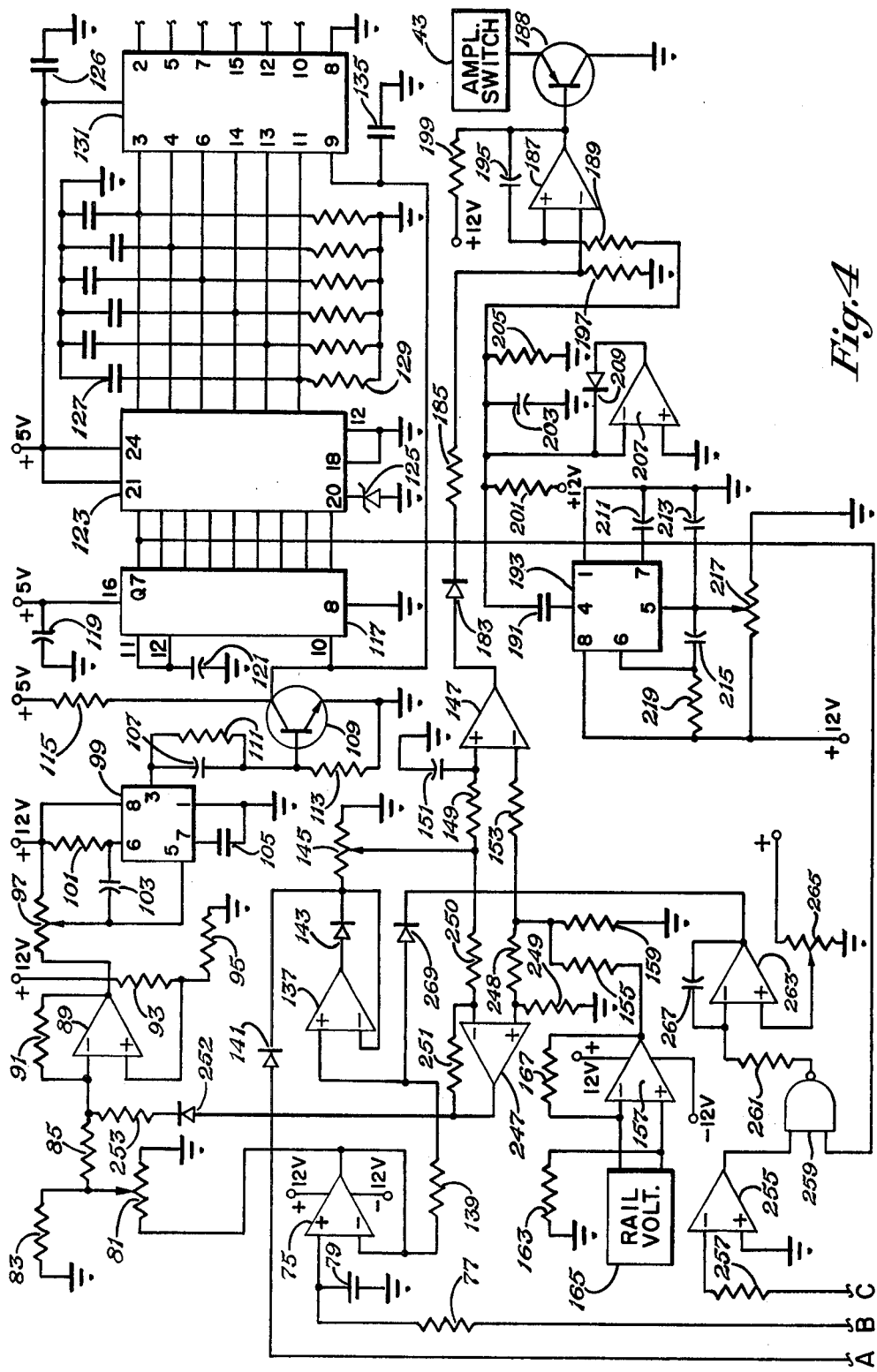
FIG. 4 is a schematic of another portion of the system of FIG. 1.

The control circuit 41, shown in detail in FIGS. 2 and 4, is controlled by a DC demand voltage that is variable to select the desired frequency. Referring to FIG. 2, the DC demand voltage is varied by a potentiometer 57, which is connected to ground through a trim potentiometer 59. Starting control circuit 61 supplies constant level DC voltage to the potentiometer 57. Starting control circuit 61 is not shown in detail, but contains safety features that include means to prevent the actuation of the motor while it is spinning in reverse. An operational amplifier 63 has its negative or source input connected to the wiper of potentiometer 57. The output of operational amplifier 63 is connected through a resistor 65 to the negative input of an integrator 67. Integrator 67 has its output connected to the positive or feedback input of operational amplifier 63. A resistor 69 and a capacitor 71 are connected in parallel between the output of integrator 67 and the negative input. The positive input of integrator 67 is grounded. A fault shutoff circuit 73 senses overload conditions and will close the circuit across capacitor 71 to bring the DC demand value at the output of integrator 67 to zero should a fault condition in the system occur.

The operation of the constant slope integrator can best be explained by referring also th FIGS. 3A, 3B and 3C. Operational amplifier 63 serves as a comparator means for comparing the demand voltage V1 with the feedback voltage V3 at its positive input. Operational amplifier 63 is connected to positive 12 volts and negative 12 volts so that any differential between its positive and negative inputs will provide an output that is either positive 12 volts or negative 12 volts. If the inputs to the operational amplifier 63 are the same, then the output is zero. If demand voltage becomes higher than the feedback voltage, the operational amplifier 63 will invert and step the difference to a negative 12 volts. If the demand voltage is less than the feedback voltage, the output of the operational amplifier 63 will be a positive 12 volts. Integrator 67 serves as integrator means for creating an increasing ramp voltage if its input is negative and a decreasing ramp voltage if its input is positive. The ramp will level into the demand voltage amount once the feedback input equals the demand voltage input of the operational amplifier 63.

For example, if the demand voltage input V1 increases from 2 to 3 volts, as shown in FIG. 3A, a negative 12 volt step voltage V2 occurs at the output of operational amplifier 63. This causes integrator 67 to begin an increasing ramp V3 of linear slope. Once the output voltage V3 equals 3 volts, which is the same as the demand voltage input V1, operational amplifier 63 will provide a zero output V2 as shown in FIG. 3B. This causes integrator 67 to level the output V3 to the demand voltage input V1.

If it is desired to decrease the speed of the motor and the demand voltage V1 is reduced from three volts to one volt, a positive 12 volt output V2 occurs at operational amplifier 63. This causes integrator 67 to provide a decreasing ramp V3 with the same slope as the increasing ramp. Once the ramp drops to one volt, the output V3 will equal the demand input V1, causing the operational amplifier 63 output V2 to drop to zero. The ramp voltage V3 will level at 1 volt.

Frequency Switch Control

The demand voltage on line B is applied to an operational amplifier 75 acting as a buffer through a resistor 77, as shown in FIG. 4. Operational amplifier 75 has a capacitor 79 connected to its positive input. The output of operational amplifier 75 leads to a potentiometer 81, the wiper of which is connected through a resistor 83 to ground. The demand voltage, conditioned by operational amplifier 75 and potentiometer 81, passes through a resistor 85 to an operational amplifier 89. Operational amplifier 89 has a resistor 91 connected between its negative input and its output. The positive input to operational amplifier 89 is connected between resistors 93 and 95, with resistor 95 leading to ground. The resistor 93 is supplied with the 12 volt source. The output of operational amplifier 89 leads to a potentiometer 97, the wiper of which is connected to an oscillator 99.

Oscillator 99 is a variable controlled oscillator that serves as oscillator means for providing a variable frequency signal depending upon the DC demand voltage supplied to it through its pin 5. Oscillator 99 is an LM566 conventional oscillator. Associated components are connected conventionally and include a resistor 101 on pin 6 which is connected to a 12 volt source. A capacitor 103 is connected between pins 5 and 6. Capacitor 105 is connected between pins 1 and 7, with pin 1 being grounded.

The output signal on pin 3 of oscillator 99 passes through a capacitor 107 to a transistor 109. A resistor 111 is connected in parallel with capacitor 107. A resistor 113 is connected between the base and emitter of transistor 109. The collector of transistor 109 is connected to a 5 volt source through a resistor 115. The signal from oscillator 99 proceeds from transistor 109 to pin 10 of a binary counter 117. Counter 117 is a conventional, CD4040, counter that counts the pulses generated by oscillator 99 and provides an 8 bit binary output for each pulse counted. Counter 117 is set to count to a selected number, preferably 256, then reset and begin counting again. At the 128th count, the binary number output is 10000000. The 129th count and subsequent counts to 256 will all begin with the binary numeral 1. The numeral 1, termed the most significant bit, is labeled Q7 in the drawing. Associated components include a 5 volt source at pin 16, with a capacitor 119 connected to ground at pin 16. Pins 11 and 12 are connected through a capacitor 121 to ground. Pin 8 is grounded.

The binary output of counter 117 is connected to a ROM (read only memory) memory means 123. ROM 123 is a conventional 2716 programmable memory unit. Counter 117 addresses the ROM 123, which has been programmed to provide a selected output for each binary number. ROM is connected in a conventional manner, having a 5 volt source at pin 24 and pin 21. A zener diode 125 is connected to pin 20 and ground. A capacitor 126 is connected to pin 24 and ground.

The output of ROM 123 leads to a data latch 131. Data latch 131 is a conventional circuit, 74C174, for storing data from ROM 123 and eliminating noise pulses. Each of the 6 output lines from ROM 123 to data latch 131 have a capacitor 127 and resistor 129 connected to ground. The output from data latch 131 leads to the interface circuits 39 (FIG. 1), which control the switches 19, 21, 23, 25, 27 and 29. Data latch 131 is connected from pin 9 to input pin 10 of counter 117. Pin 9 of data latch 131 is connected to a capacitor 135 which is grounded.

In the operation of the frequency switch control, the DC demand value selected on line B is conditioned and applied to oscillator 99 to control the frequency of oscillator 99. The signal from oscillator 99 is applied to counter 117, which counts to 256, providing a binary output for each count, then recycles. The binary output addresses ROM 123, which provides a programmed output to data latch 131 depending upon the binary number received. Data latch 131 controls the switches to open and close the switches 19, 21, 23, 25, 27 and 29 in sequence to provide three-phase power to the motor 37 (FIG. 1). In the preferred embodiment, each switch 19–29 remains closed for a full half cycle. This results in a six step square wave output on lines 31, 33, and 35.

Amplitude Switch Control

Amplitude switch 43 of FIG. 1 is operated by a pulse width control circuit 45 to vary the magnitude of the DC rail voltage on rails 15 and 17 in proportion to the frequency selected. The pulse width control circuit 45 includes an operational amplifier 137, shown in FIG. 4, that is connected through a resistor 139 to the output of operational amplifier 75. The positive input of operational amplifier 137 will thus receive a value proportionate to the DC demand value set by speed potentiometer 57 shown in Fig. 2. The negative input to operational amplifier 137 is connected to a regulated DC value supplied by the starting control circuit 61 (FIG. 2), through line B. A diode 141 is connected into this line. A diode 143 is connected to the output of operational amplifier 137. The cathode of diode 137 is connected to a potentiometer 145, which is grounded. Potentiometer 145 is also connected to the regulated DC value on line B.

A value proportional to the DC demand voltage for controlling the frequency is provided to potentiometer 145, which is connected through its wiper to an operational amplifier 147. A resistor 149 is connected between the positive input of operational amplifier 147 and the wiper of potentiometer 145. A capacitor 151 is connected to the positive input of operational amplifier 147 and to ground. Operational amplifier 147 also receives a DC value proportional to the actual voltage on the positive and negative rails 15 and 17 (FIG. 1). A value corresponding to the rail voltage is provided through a resistor 153 and resistor 155 from the output of an operational amplifier 157. The output of operational amplifier 157 is connected to a resistor 159 which is grounded. The positive input of operational amplifier 157 is connected through a resistor 163 to ground. Rail voltage, indicated by numeral 165, is provided to the positive and negative inputs of operational amplifier 157. A resistor 167 is connected between the negative input and the output of operational amplifier 157.

The control of the amplitude of the voltage in proportion to the frequency selected includes comparing the DC demand voltage at the positive input of operational amplifier 147 to the negative or feedback input, which represents the actual rail voltage indicated by numeral 165. The output of operational amplifier 147, if positive, indicates that the DC demand value is higher than the value corresponding to the rail voltage 165. This positive output will increase the on duration of amplitude switch 43 (FIG. 1), increasing the value of the rail voltage in proportion to the higher demand voltage.

The positive output of operational amplifier 147 leads to the negative input of a comparator 187 through diode 183 and resistor 185. Comparator 187 serves as a means for comparing this DC positive value at its negative input to a triangular wave of fixed frequency. If the triangular wave has a portion that exceeds the DC input, positive or high pulses equal to the difference are provided at the output of comparator 187. The base of a PNP transistor 188 is connected to the output of operational amplifier 187. The emitter of transistor 188 is connected to amplitude switch 43 and the collector is connected to ground. A low output of operational amplifier turns on transistor 188, which closes amplitude switch 43. A higher demanded voltage at the negative input of comparator 187 results in negative pulses or lows having greater widths than a lower demanded voltage. These negative pulses turn on transistor 188 longer, closing the amplitude switch 43 longer to increase the rail voltage. Conversely, if the demand voltage at the negative input of comparator 187 is zero, then a continuous positive output is provided by comparator 187, which turns off transistor 188, opening amplitude switch 43 until a demand voltage is again present.

The components associated with comparator 187 for performing this function include a resistor 189 and a capacitor 191 connected to the positive input of comparator 187 and to pin 4 of an oscillator 193. Oscillator 193 is the same type as oscillator 99 but is set to provide a fixed 40 KHZ triangular wave on output pin 4. Comparator 187 has a capacitor 195 connected between the positive input and its output. A resistor 197 is connected to the negative input of comparator 187 and to ground. A 12 volt supply is provided through a resistor 199 to the output of comparator 187.

The components associated with oscillator 193 include a resistor 201 connected to a 12 volt source and between capacitor 191 and resistor 189. A capacitor 203 and a resistor 205 are connected in parallel and to ground from the line leading from resistor 189 to capacitor 191. An operational amplifier 207 serves as a clamp, having its positive input grounded and its negative input connected to the line that leads from capacitor 191 to resistor 189. Operational amplifier 207 has a diode connected between its output and its negative input. A capacitor 211 is connected between pin 7 of oscillator 193 and ground. A capacitor 213 is connected between pin 5 and ground. A capacitor 215 is connected between pin 5 of oscillator 193 and pin 6. A potentiometer 217 is connected between ground and has its wiper connected to pin 5 of oscillator 193. A resistor 219 is connected between pin 6, capacitor 215 and a 12 volt source.

Regeneration Control

If a load begins driving motor 37, it may begin regenerating current. One manner in which to at least partially control regenerating current is by causing the frequency to increase if a value corresponding to the rail voltage exceeds a value corresponding to the demand voltage. Referring to FIG. 4, this is handled by a circuit that includes an operational amplifier 247 which compares the value corresponding to actual rail voltage with the DC demand voltage. If its negative input is less than the value corresponding to the actual rail voltage at the positive input, then a positive value is fed into operational amplifier 89 to increase the demand frequency. This would occur if regeneration current was present.

The associated circuitry with operational amplifier 247 includes a resistor 248 connected to the positive input and to resistor 155. A resistor 249 is connected between ground and the positive input of operational amplifier 247. A resistor 250 is connected to the resistor 149 and to the negative input of operational amplifier 247. A resistor 251 is connected between the negative input and the output of operational amplifier 247. A diode 252 and a resistor 253 are connected in series between the output of operational amplifier 247 and the negative input of operational amplifier 89.

Power Factor Correction

The power input to motor 37 is equal to the current times the voltage times the cosine of the phase angle between the current and the voltage. In induction motors such as motor 37, the current will normally lag the voltage by a variable amount. Maximum power is produced when the current and voltage are in phase. It is known that reducing the voltage amplitude will improve the power factor to provide more efficient operation. Circuitry is shown in FIG. 4 for automatically reducing the amplitude on the positive and negative rails, and thereby the voltage, when the current lags the voltage. The circuitry includes a current transformer 254 (FIG. 2), which measures the current in one phase of the power conductors leading to motor 37.

As indicated by the numeral C, shown also in FIG. 4, the current signal passes to a zero cross-detector 255 through a resistor 257. Zero cross-detector 255 is an operational amplifier that squares and inverts the current signal and applies it to an AND gate 259. The other input of AND gate 259 is the most significant bit Q7 of counter 117. For the first half of phase A signal, the most significant bit Q7 will be zero, and for the second half, the most significant bit will be a constant 1. If the current and voltage are in phase, the most significant bit will be zero or low while the inverted current is high and vice versa. Consequently, the output of AND gate 259 will always be low when the current and voltage are in phase. On the other hand, if the current is lagging the voltage, the most significant bit will be changing from zero to 1 while the current is still high and has not yet made a zero cross to change to low. This overlap is the same as the phase difference between the current and voltage, and will produce a high output on the AND gate 259 for the duration of the overlap. AND gate 259 serves as phase detector means for detecting this difference in phase.

The high output from AND gate 259 proceeds through a resistor 261 to an averaging means 263. Averaging means 263 is an integrator that converts the pulses representing the phase angle into an average DC value. Integrator 263 includes a potentiometer 265, which is connected to ground and has a wiper connected to the positive input of integrator 263. A capacitor 267 is connected between the negative input and the output of integrator 263. The output of integrator 263 is connected to the cathode of a diode 269, which is connected to the positive input of operational amplifier 137. Operational amplifier 137 receives the demand voltage from the buffer amplifier 75 and the linear slope integrator. If integrator 263 receives phase difference pulses, it provides an average DC output which draws down the demand voltage at the positive input of operational amplifier 137, providing a current path to ground. A lower demand voltage will result at comparator 187, reducing the amount of time that the output of comparator 187 is low. This causes transistor 188 to conduct less and amplitude switch 43 to remain closed less, resulting in a lower rail voltage. The lower rail voltage improves the power factor.

Temperature Control

Means are provided in the system for reducing the frequency and thus the speed of the motor if the temperature becomes excessive. This means is shown in FIG. 2 and includes a constant current source 271 that supplies a small amount of current to flow through a zener diode 273, which serves as a temperature sensor means. Zener diode 273 is connected to ground and is located in a portion of the variable speed drive system where excess temperature is possible. The constant current source 271 is connected through a resistor 274 to an operational amplifier 275. The voltage present at the negative input of operational amplifier 275 will be a function of the resistance of zener diode 273, which is proportional to the temperature. The positive input of operational amplifier 275 is connected to the wiper of a potentiometer 277. Potentiometer 277 is connected through a resistor 279 to a 12 volt source, with the other side of the potentiometer being connected to ground.

The DC reference voltage at the positive input to operational amplifier 275 is compared to the DC value at the negative input, which depends on the temperature, with an output being provided to the cathode of a diode 281. If the value at the negative input of operational amplifier 275 is greater than the selected reference voltage at the positive input, then a negative output will provide a current path through diode 281 to ground. This draws down the demand voltage through a connection from the anode of diode 281 to the negative input of linear slope comparator 63. If the reference voltage exceeds the value at the negative input of operational amplifier 275, the positive output is blocked by the blocking means or diode 281.

Other components in the temperature control include a capacitor 283 connected between the negative input and the output of operational amplifier 275. A resistor 285 is also connected between the negative input and the output of operational amplifier 275.

Current Limiting

Means are also provided in the circuit to reduce the frequency and thus the speed of the motor if the current exceeds a selected maximum. Referring to FIG. 2, this current limiting means includes a rectifier 287 that is connected to current transformer 254. Rectifier 287 rectifies the actual current on the power conductors 31, 33 and 35, and provides a DC output proportional to that amount. Rectifier 287 is a three phase bridge and has a capacitor 289 connected between its outputs and ground. A resistor 291 connects the rectifier 287 to the negative input of an operational amplifier 293.

Operational amplifier 293 has its positive input connected to the wiper of a potentiometer 295. Wiper 295 is connected to ground and through a resistor 297 to a 12 volt source. Operational amplifier 293 compares the reference voltage provided by potentiometer 295 to the DC value at its negative input, which corresponds to the actual current. If the current exceeds the reference value, then a negative output is provided to the cathode of a diode 299. Diode 299 is also connected to the negative input of operational amplifier 63, which receives the demand voltage from the speed potentiometer 57. If a negative output results at operational amplifier 293 due to excessive current, then a current path is provided to ground, drawing down the demand voltage provided to the operational amplifier 63.

Additional circuitry associated with operational amplifier 293 include a capacitor 301 connected between the negative input and the output of operational amplifier 293. A resistor 303 is also connected between the output and the negative input of operational amplifier 293.

Overall System Operation

Referring to FIG. 2, the speed of the motor 37 is varied by varying the value on speed potentiometer 57. This results at operational amplifier 63 in a step voltage V2 (FIG. 3B) of negative 12 volts if the speed is increased, and a step voltage of positive 12 volts if the speed is decreased. Integrator 67 provides a ramp output V3 that increases if the step voltage V2 is negative and decreases if the step voltage V2 is positive. The slope is constant and levels into the same amount as the demand voltage when the output of integrator 67 equals the demand voltage.

Referring to FIG. 3, the demand voltage is applied through line B to a buffer amplifier 75. The demand voltage is conditioned and applied to an oscillator 99 to vary the frequency of the oscillator. Oscillator 99 provides a signal that is counted by counter 117, which provides a binary output to ROM 123. ROM 123 is programmed to provide signals to open and close FET switches 19, 21, 23, 25, 27 and 29, shown in FIG. 1, to provide a six step square wave to motor 37.

At the same time, the amplitude of the voltage is varied in proportion to its frequency by applying the demand voltage to operational amplifier 147. Operational amplifier 147 provides a value proportional to the demand voltage to comparator 187. Comparator 187 compares this value to a fixed rate triangular wave from oscillator 193 to provide high output pulses corresponding to the difference. The low between the pulses turns on transistor 188 and closes the amplitude switch, with the high opening the amplitude switch to vary the voltage on the rails.

Should regeneration occur, the regenerating current will cause the frequency of the switching to increase. This is accomplished through operational amplifier 247, which increases the demand voltage provided to the oscillator 99 in proportion to the amount of regenerating current.

The power factor is improved by squaring and inverting the current through zero cross means 255. AND gate 259, which has one input connected to the most significant bit Q7 of the counter 117, provides an output when both the inverted current and the most significant bit are high, this output being the same as the phase difference between the current and voltage. The output pulses are averaged, with the averaged value drawing down the DC demand voltage that is applied to the amplitude section of the circuit at operational amplifier 137. The lower demand voltage from operational amplifier 137 results in a lower potential difference between the rails 15 and 17, improving power factor.

Should overheating in the system occur, the speed of the motor will be reduced in proportion to the amount of overheating that exists. As shown in FIG. 2, operational amplifier 275 compares the DC value at its negative input which is proportional to the temperature of the zener diode 273, to a reference voltage supplied by potentiometer 277. If the temperature input voltage is greater, a negative current path is provided for drawing down the demand voltage V1 (FIG. 3A) at the linear slope integrator.

Similarly, if excessive current is encountered, an operational amplifier 293 compares this actual current on the power conductors to a reference value provided by potentiometer 295. If the actual current is greater than this reference value, a negative current path is provided that draws down the demand voltage V1 (FIG. 3A) at the linear slope integrator.

The system has significant advantages. Squaring the current in the power conductors and comparing it with voltage in the frequency switch means circuitry provides a precise means for detecting the difference in phase between the current and the voltage. Averaging the resulting phase difference pulses and applying that average to the existing DC demand voltage circuit for controlling the amplitude provides an efficient manner for reducing the voltage amplitude to improve the power factor. The power factor correction circuit thus blends in with existing control circuits in the system to provide more efficient use of the circuit and avoid additional complexity and expense.

While the invention has been shown in only one of its forms, it should be apparent to those skilled in the art that it is not so limited but is susceptible to various changes without departing from the scope of the invention.

I claim:

1. In a system for varying the speed of a motor, the system having rectifying means for converting AC voltage supplied by a power source to DC voltage on a positive rail and a negative rail, and frequency switch means for alternately connecting the rails to power conductors at a variable rate to define a voltage frequency, an improved means to vary the amplitude of the DC voltage on the rails to improve the power factor, comprising in combination:

amplitude switch means for alternately switching on and off the DC voltage in one of the rails;

pulse width means for providing amplitude pulses of duration proportional to the voltage frequency, and for actuating the amplitude switch means with the amplitude pulses to vary the DC voltage on the rails;

current sensing means for sensing a current waveform in one of the conductors;

phase detector means for providing phase difference pulses with widths corresponding to a difference in phase between the current waveform and the voltage frequency; and averaging means for providing to the pulse width means an average DC value proportional to the widths of the phase difference pulses to reduce the DC voltage on the rails proportional to the average DC value.

2. In a system for varying the speed of a motor, the system having rectifying means for converting AC voltage supplied by a power source to DC voltage on a positive rail and a negative rail, frequency switch means for alternately connecting the rails to the power conductors, control means for controlling the frequency switch means at a variable rate to define a voltage frequency, an improved means to vary the amplitude of the DC voltage on the rails to improve the power factor, comprising in combination:

amplitude switch means for alternately switching on and off the DC voltage in one of the rails;

pulse width means for providing amplitude pulses of duration proportional to the voltage frequency, and for actuating the amplitude switch means with the amplitude pulses to vary the DC voltage on the rails;

current sensing means for sensing a current waveform in one of the conductors;

zero crossing means for squaring the current waveform;

phase detector means having one input connected to the zero crossing means and another to the control means for providing phase difference pulses with widths corresponding to the interval between the point at which the current waveform changes from high and low and the voltage frequency changes between high and low; and averaging means for providing to the pulse width means an average DC value proportional to the widths of the phase difference pulses to reduce the DC voltage on the rails proportional to the average DC value.

3. In a system for varying the speed of a motor, the system having rectifying means for converting AC voltage supplied by a power source to DC voltage on a positive rail and a negative rail, frequency switch means for alternately connecting the rails to the power conductors, control means for controlling the frequency switch means at a variable rate to define a voltage frequency, an improved means to vary the amplitude of the DC voltage on the rails to improve the power factor, comprising in combination:

oscillator means for supplying pulses of variable frequency;

counter means for counting the pulses of the oscillator means and for providing a binary output for each pulse counted, the counter means counting to a selected number of pulses, then recycling to define a cycle that represents an AC cycle;

memory means for providing to the switch means a programmed output that synthesizes a desired AC voltage waveform from the binary output received from the counter means;

amplitude switch means for alternately switching on and off the DC voltage in one of the rails;

pulse width means for controlling the amplitude switch means with amplitude pulses;

current sensing means for sensing a current waveform in one of the conductors;

zero crossing means for squaring the current waveform to provide a zero cross;

phase detector means connected to the zero cross means and to the memory means for providing phase difference pulses with widths corresponding to the difference in time between the zero cross and the beginning of the cycle at the memory means; and averaging means for providing to the (source) pulse width means an average DC value proportional to the widths of the phase difference pulses to reduce the DC voltage on the rails proportional to the average DC value.

4. In a system for varying the speed of a motor, the system having rectifying means for converting AC voltage supplied by a power source to DC voltage on a positive rail and a negative rail, frequency switch means for alternately connecting the rails to the power conductors, control means for controlling the frequency switch means at a variable rate to define a voltage frequency, an improved means to vary the amplitude of the DC voltage on the rails to improve the power factor, comprising in combination;

oscillator means for supplying pulses of variable frequency;

counter means for counting the pulses of the oscillator means and for providing a binary output for each pulse counted, the counter means counting to a selected number of pulses, then recycling to define a cycle that represents an AC cycle;

memory means for providing to the switch means a programmed output that synthesizes a desired AC voltage waveform from the binary output received from the counter means;

amplitude switch means for alternately switching on and off the DC voltage in one of the rails;

pulse width means for controlling the amplitude switch means with amplitude pulses;

source means for providing a variable DC demand potential to the oscillator means and to the pulse width means;

current sensing means for sensing current in one of the conductors;

zero crossing means for squaring the current waveform;

inverter means for inverting one of the waveforms present at the zero crossing means and the memory means with respect to the other;

AND gate means having one input connected to the zero crossing means and another to the memory means for providing phase difference pulses when both waveforms are high; and averaging means for providing to the source means an average DC value.

5. In a system for varying the speed of a motor, the system having rectifying means for converting AC voltage supplied by a power source to DC voltage on a positive rail and a negative rail, and frequency switch means for alternately connecting the rails to power conductors at a variable rate to define a voltage frequency, control means for sending command signals to the frequency switch means to vary the rate of the frequency switch means, an improved means to vary the amplitude of the DC voltage on the rails to improve the power factor, comprising in combination:

regulating means for varying the DC voltage on the rails;

current sensing means for sensing a current waveform in one of the conductors;

phase detector means for comparing the current waveform to the command signals and for providing phase difference pulses with widths corresponding to a difference in phase between the current waveform and the command signals; and averaging means for providing to the regulating means an average DC value proportional to the widths of the phase difference pulses to reduce the DC voltage on the rails proportional to the average DC value.

* * * * *

UNITED STATES PATENT AND TRADEMARK OFFICE
CERTIFICATE OF CORRECTION

PATENT NO. : 4,467,258
DATED : August 21, 1984
INVENTOR(S) : John M. Leuthen

It is certified that error appears in the above-identified patent and that said Letters Patent is hereby corrected as shown below:

Column 11, Claim 3, line 57, delete "source".

Signed and Sealed this

Twenty-third Day of April 1985

[SEAL]

Attest:

DONALD J. QUIGG

Attesting Officer     Acting Commissioner of Patents and Trademarks